US006765741B2

United States Patent
Berman et al.

(10) Patent No.: US 6,765,741 B2
(45) Date of Patent: Jul. 20, 2004

(54) ADJUSTING A READ DETECTION EQUALIZER FILTER OF A MAGNETIC TAPE DRIVE EMPLOYING A RECORDING FORMAT REQUIRED CONTROL PATTERN

(75) Inventors: David Berman, San Jose, CA (US); Mario Blaum, San Jose, CA (US); Glen Alan Jaquette, Tucson, AR (US); Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/302,885

(22) Filed: Nov. 25, 2002

(65) Prior Publication Data
US 2004/0100714 A1 May 27, 2004

(51) Int. Cl.[7] .............................................. G11B 5/035
(52) U.S. Cl. ......................................... 360/65; 360/46
(58) Field of Search ...................... 362/65, 46; 375/232

(56) References Cited

U.S. PATENT DOCUMENTS

| | | | | |
|---|---|---|---|---|
| 5,325,436 A | | 6/1994 | Soli et al. ...................... 381/68 |
| 5,493,412 A | * | 2/1996 | Koyama et al. ............... 360/65 |
| 5,727,074 A | | 3/1998 | Hildebrand ................... 381/103 |
| 5,835,666 A | * | 11/1998 | Gohda et al. .................. 386/85 |
| 6,055,119 A | * | 4/2000 | Lee ............................... 360/65 |
| 6,055,269 A | | 4/2000 | Drost et al. .................. 375/232 |
| 6,160,673 A | * | 12/2000 | Izumi et al. ................... 360/65 |
| 6,327,317 B1 | | 12/2001 | Chennakeshu et al. ....... 375/341 |
| 6,366,418 B1 | | 4/2002 | McEwen et al. ............... 360/48 |
| 6,493,165 B1 | * | 12/2002 | Satoh et al. ................... 360/65 |

* cited by examiner

Primary Examiner—David Hudspeth
Assistant Examiner—Rocio Colon
(74) Attorney, Agent, or Firm—Jonh H. Holcomsbe

(57) ABSTRACT

Adjustment of a read detection equalizer filter of a magnetic tape drive is conducted utilizing a required control pattern signal which comprises a required portion of a normal recording format of the magnetic tape. An example comprises a data set separator signal. The sensed required control pattern signal is processed with respect to a target reference pattern signal to adapt the read detection equalizer filter to the target reference pattern signal.

59 Claims, 5 Drawing Sheets

$$\begin{bmatrix} T_1 \\ T_2 \\ T_3 \\ \cdot \\ \cdot \\ \cdot \\ T_{M+N-1} \end{bmatrix} = \begin{bmatrix} S_1 & 0 & \cdots & 0 \\ S_2 & S_1 & \cdots & 0 \\ \cdot & S_2 & \cdots & S_1 \\ \cdot & \cdot & \cdots & S_2 \\ S_M & \cdot & \cdots & \cdot \\ 0 & S_M & \cdots & \cdot \\ 0 & 0 & \cdots & S_M \end{bmatrix} \begin{bmatrix} E_1 \\ \cdots \\ E_N \end{bmatrix}$$

FIG. 8

$$A = \begin{bmatrix} A_1 & A_2 & \cdot & A_n \\ A_2 & A_1 & \cdot & A_{n-1} \\ A_3 & A_2 & \cdot & A_{n-2} \\ \cdot & \cdot & \cdot & \cdot \\ \cdot & \cdot & \cdot & \cdot \\ A_n & A_{n-1} & \cdot & A_1 \end{bmatrix}$$

FIG. 9

ADJUSTING A READ DETECTION EQUALIZER FILTER OF A MAGNETIC TAPE DRIVE EMPLOYING A RECORDING FORMAT REQUIRED CONTROL PATTERN

FIELD OF THE INVENTION

This invention relates to equalization of magnetic tape signals, and, more specifically, to adjusting the equalizer of magnetic tape drives.

BACKGROUND OF THE INVENTION

The read waveform of a magnetic recording channel requires filtering prior to read detection to shape it. This filter is called an equalizer.

The magnetic write and read heads are typically formed by thin film processes which have a range of acceptable tolerances such that the transfer functions differ to some extent, and so that no one equalization filter matches all heads. Therefore, equalization filters typically are arranged to match a particular head.

Typically, one or more of multiple iterative algorithms are employed to initialize an equalization filter, such as a least mean squares (LMS) algorithm, using the waveform of a special test pattern or using data as the signal to which the algorithm is applied. A drawback of this method is that it requires many iterations to converge. The LMS approach is discussed with respect to data communication in "Principles of Data Communication", R. W. Lucky et al., McGraw-Hill, New York, 1968, pp. 156–165. As another example, a Zero Forcing (ZF) algorithm could be used.

The special test pattern may comprise an equalizer training sequence applied to an equalizer filter at manufacture of the tape drive by a special test tape, which may comprise a pseudo-random binary sequence (PRBS), which contains repetitions of combinations of signals, so that an LMS algorithm may set the equalizer filter.

An equalizer training sequence, for example, may be supplied on the special test tape, and, as another example, as a special calibration pattern written at a specified location of a data tape, such as discussed in U.S. Pat. No. 6,366,418, McEwen et al. If employed as a repeated calibration pattern on a data tape, the equalizer training sequence might occupy a significant length of the magnetic tape, detracting from the amount of data that would otherwise be stored.

The LMS algorithm relies upon tentative decisions to be made on the pseudo-random training data, or the random data waveforms, which typically causes the algorithm to converge on a correct transfer function, but with enough noise, these decisions can be erroneous, causing the algorithm to diverge with improper updates to the equalizer taps.

SUMMARY OF THE INVENTION

The present invention comprises a method and system for a magnetic tape drive, implemented as hardware logic or as a computer program product usable with a programmable computer processor having computer readable program code embodied therein, for adjusting an adjustable read detection equalizer filter of a read detection system for a magnetic tape drive.

As known to those of skill in the art, magnetic tapes are arranged with standardized formats, typically with various recording format required control pattern signal fields throughout the magnetic tape. For example, a Linear Tape Open (LTO) magnetic tape will be recorded with a sync mark, a VFO field (variable frequency oscillator), and a data set separator field (DSS) between data sets.

In one embodiment of the present invention, a control processor is responsive to at least a portion of a required control pattern signal sensed from a magnetic tape by the magnetic read head, the required control pattern signal comprising a required portion of a normal recording format of the magnetic tape. The control processor processes the sensed required control pattern signal with respect to a target reference pattern signal to adapt the read detection equalizer filter to the target.

In a further embodiment, the required control pattern signal comprises a pattern of signals outside the normal encoded data detection of the magnetic tape drive. An example comprises the data set separator (DSS) signal, also called an interblock gap signal, discussed above. A control pattern recognition sensor of the system for recognizing the required control pattern signal, additionally triggers the control processor to respond to the sensed required control pattern signal. In an embodiment related to an example of a DSS signal, the control pattern recognition sensor recognizes at least one signal of a greater time period than a maximum time period of normal encoded data detection of the magnetic tape drive, as being the required control pattern signal. In an embodiment related to another example of a data set separator signal, the control pattern recognition sensor recognizes a sequence of signals outside normal encoded data detection of the magnetic tape drive, as being the required control pattern signal.

In another embodiment, the control processor additionally cancels baseline distortion of the sensed required control pattern signal. In one example, the control processor cancels the baseline distortion of the sensed required control pattern signal by conducting cosine compensation of the baseline distortion.

In a still further embodiment, wherein the required control pattern signal is repeated at a plurality of locations of a magnetic tape read by the magnetic tape drive, the read detection system additionally comprises an error detector for detecting that reading of data of a magnetic tape exceeds a read error trigger. As the result of an error trigger, a selection is made of at least one required control pattern signal, which may have already been captured, in close proximity to the data detected as exceeding the read error trigger. In another embodiment, wherein the read detection equalizer filter comprises adjustable presets, the control processor temporarily adapts the read detection equalizer filter from those presets. In a further embodiment, the control processor additionally resets the read detection equalizer filter to the presets for a magnetic tape subsequently loaded in the magnetic tape drive.

In still another embodiment, wherein a loading detector is provided for detecting loading of a magnetic tape in the magnetic tape drive, operation of the control processor to respond to the sensed required control pattern signal is initiated in response to detecting loading of a magnetic tape. Still further, each encountered required control pattern signal triggers adaption of the read detection equalizer filter.

In a further embodiment, the control processor responds to time based digital samples of the required control pattern signal; and directly adapts the read detection equalizer filter employing the time based digital samples and the target reference pattern signal. In another embodiment, the control processor additionally rotates a minimum slope point of a signal vector of the sensed required control pattern signal to an end of the signal vector and sets the minimum slope point to zero.

In a further embodiment, the control processor responds to digital samples of magnetic transitions of the required control pattern signal; and additionally averages similar digital samples of the magnetic transitions within a window comprising a plurality of the magnetic transitions.

For a fuller understanding of the present invention, reference should be made to the following detailed description taken in conjunction with the accompanying drawings.

BRIEF DESCRIPTION OF THE DRAWINGS

FIGS. 8 and 9 are matrix equations representing an embodiment of calculations in accordance with the method of FIG. 5.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
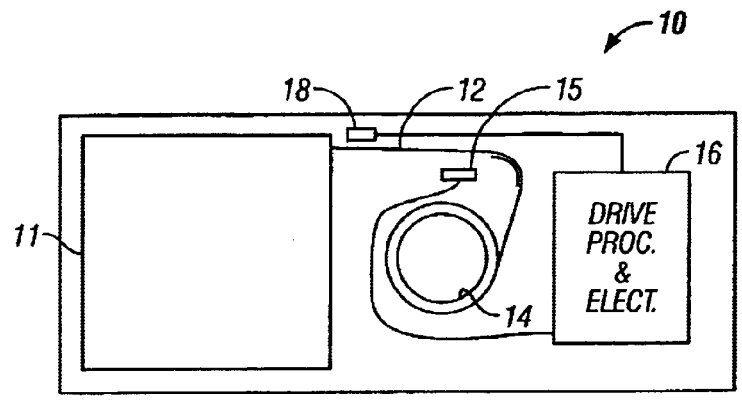
FIG. 1 is a block diagram of an embodiment of a magnetic tape drive which implements the present invention.

Referring to FIG. 1, an embodiment of a magnetic tape drive 10 is illustrated having a magnetic tape cartridge 11 loaded in the magnetic tape drive, with a magnetic tape 12 partially wound on a take up reel 14. The magnetic tape 12 is wound past a magnetic head 15 by a drive mechanism which drives the take up reel 14 and a supply reel in the magnetic tape cartridge 11. In an alternative embodiment, the magnetic tape cartridge 11 may comprise both the supply and take up reels. Tape drive electronics and processor 16 operate the magnetic tape drive 10 in accordance with commands from a host, and employ the magnetic head 15 for writing and reading data with respect to the magnetic tape 12. A loading detector 18 detects the loading of a magnetic cartridge 11 in the magnetic tape drive. Alternatively, the loading detector 18 detects that the magnetic tape 12 is withdrawn from the magnetic tape cartridge 11. Still alternatively, the loading detector is associated with the magnetic head 15 and senses the type of magnetic tape 12 loaded in the magnetic tape drive 10.

Figure 2:
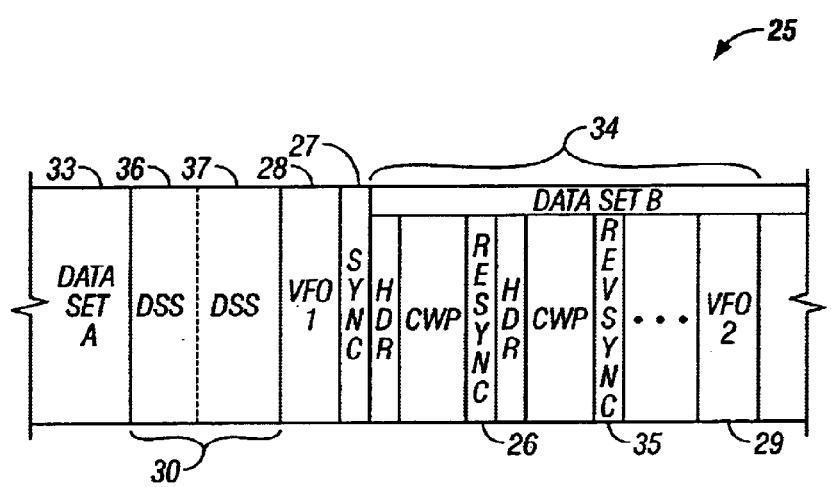
FIGS. 2 and 3 are diagrammatic representations of a format of a magnetic tape which is utilized in accordance with an embodiment of the present invention.
Figure 3:
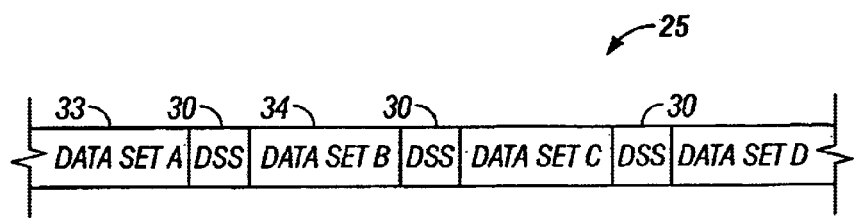

Referring to FIGS. 2 and 3, magnetic tapes, such as tape 25, are arranged with standardized formats, typically with various required recording format control pattern signal fields throughout the magnetic tape. For example, a Linear Tape Open (LTO) magnetic tape will be recorded with a sync mark 27, one or more VFO fields (variable frequency oscillator) 28, 29, and a data set separator (DSS) field 30 between data sets 33 and 34. In the event that a data set, e.g., data set 33, is written, followed by a pause, the drive processor and electronics write a data set separator field, e.g., DSS 36, following the data set. Subsequently, the magnetic tape is stopped, the direction of motion reversed to move the tape such that the magnetic head is positioned beyond the start of DSS 36 in the direction of the data set 33, the tape again stopped and moved in the forward direction such that it passes the end of the data set 33, and writing is begun with a new DSS, e.g., DSS 37, beginning after some minimum length of DSS 36.

The data sets are also subject to format requirements, such as resync signals 26 between data and error correction code codeword pairs (CWP) and headers, and a reverse sync field 35 at the end of the data set.

Data processing tape drives typically employ similar formats, but may employ different names. For example, the standards for 3590 "MAGSTAR" type tape cartridges employ a similar data set separator, but in that case (MAGSTAR) it is called interblock gap (IBG).

Tape interchange standards fix the format written to tape to insure that the tapes are interchangeable between tape drives, especially those manufactured by different companies. For example, the VFO pattern 28 is a specified signal pattern, the sync pattern 27 may be specified, and the data set separator signal pattern is specified. Such a signal pattern that is specified by the format standards for format purposes and not as an equalization test pattern is termed herein a "required control pattern signal", "comprising a required portion of a normal recording format".

Referring specifically to the LTO format, one standard, Generation 1, requires that the DSS have transitions that are separated by a greater distance than the maximum run length limited code (RLL) distance of the data. Thus, the maximum run length limited code $(d,k)=(1,7)$ is a maximum distance of seven zeroes between adjacent ones inside the code, which means a maximum wavelength of "8T", or 8 bit periods. The DSS is specified by the standard format to be a "9T" signal, clearly outside the RLL data code. The MAGSTAR IBG has the same standard format requirement.

A Generation 2 LTO DSS format is different to accommodate a new data format. There, a sequence comprising two adjacent "12T" wavelengths is constrained from being encoded data, and the standard format for the DSS is a stream of consecutive 12T wavelengths.

A DSS format offers transitions that are spaced apart, affording a wide frequency spectrum for determining the filter equalization. Other format required fields may alternatively be employed as required control pattern signals. As one example, resync fields 26 and reverse sync field 35 may be employed as a set of required control pattern signals. As another example, sync field 27, with or without a portion of the adjacent VFO field 28, may be employed with some of the resync fields 26 as a set of required control pattern signals.

Figure 4:
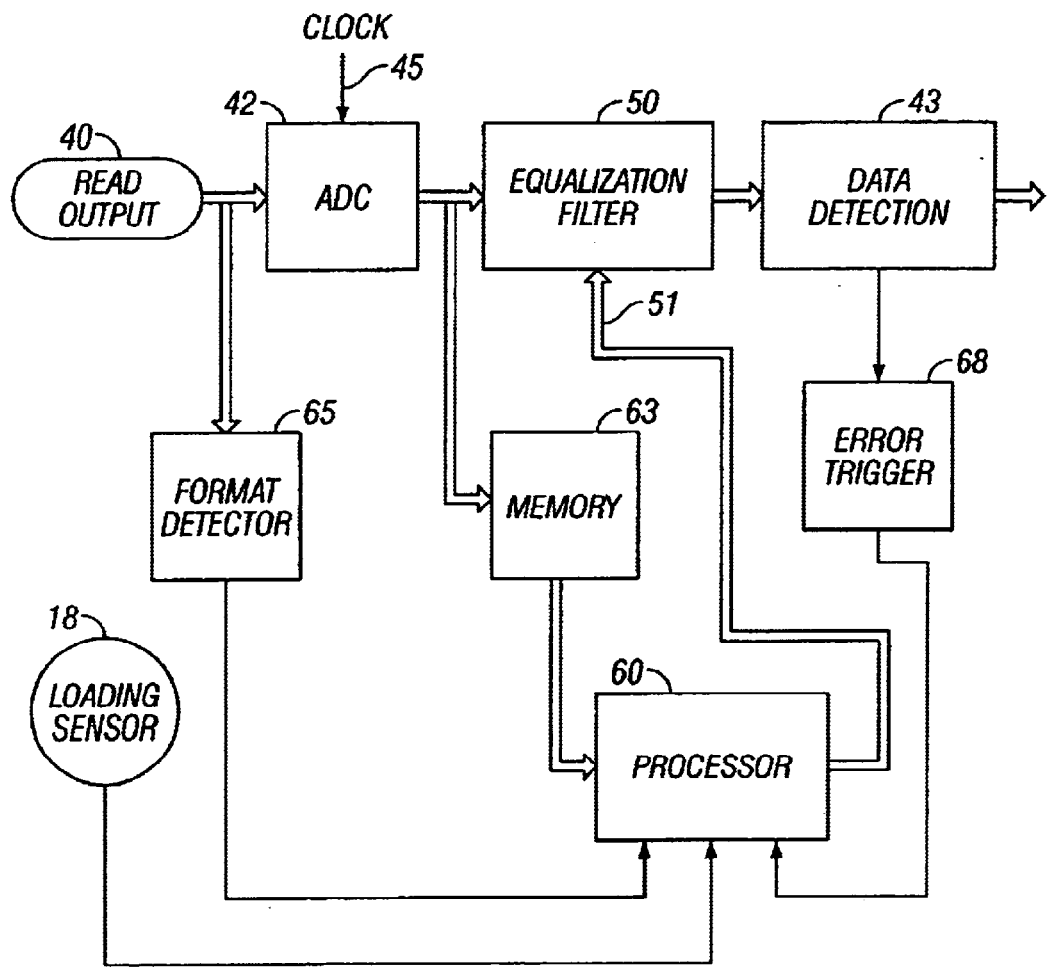
FIG. 4 is a block diagram of a read detection system of the magnetic tape drive of FIG. 1.

Referring to FIG. 4, an embodiment of a read detection system of the magnetic tape drive of FIG. 1 in accordance with the present invention, reads data sensed by a read head and analog front end to provide a read output 40 of FIG. 4. Recorded data is typically digitally detected by taking samples of the recorded signals and digitally indicating the values of the samples, for example, by ADC (analog to digital converter) 42 of FIG. 4. The samples may be taken synchronously such that the data detector is run by a clock that is precisely synchronized with the recorded signals as they are read. Alternatively, the samples may be taken asynchronously with an oversampling rate clock. The examplary data detection 43 employs such asynchronous samples from examplary ADC 42, run by clock 45.

The read waveform of a magnetic recording channel requires filtering prior to read detection to shape the waveform, called "equalization", and is accomplished by an adjustable read detection equalizer filter 50 having adjustable filter taps 51.

In one embodiment of the present invention, a control processor 60 is responsive to at least a portion of a required control pattern signal sensed from a magnetic tape by the magnetic read head 40. As discussed above, the required control pattern signal comprises a required portion of a normal recording format of the magnetic tape. The control processor processes the sensed required control pattern signal with respect to a target reference pattern signal to adjust the adjustable read detection equalizer filter taps 51 of the read detection equalizer filter 50 to adapt the filter to the target. The control processor 60 comprises a programmable computer processor operating under the control of program code. The processing unit may comprise any microprocessor device known in the art, and the code is typically maintained in a nonvolatile memory. The method of the present invention may be provided in the form of a computer program product usable with a programmable computer processor having computer readable program code embodied therein, and may be supplied to the control processor 60 in any of various ways as are known to those of skill in the art. Alternatively, the method of the present invention may be provided in the form of hardware logic in any of various ways as are known to those of skill in the art, such as a digital signal processor (DSP) or state machine, also comprising control processor 60.

The raw, unequalized digital samples of the output of the head 40, including the required control pattern signal, may be stored in a memory 63. The memory may comprise a volatile memory, such as a RAM (random access memory), or a buffer, or may comprise a nonvolatile memory, such as a NVRAM (nonvolatile random access memory), or flash memory, etc.

A typical magnetic tape system comprises a number of parallel tracks and a plurality of read heads 40, each with an ADC 42. Thus, memory 63 will store required control pattern signals for each of the tracks read by a read head 40 and ADC 42.

A format detector 65, or control pattern recognition sensor, detects the sensed required control pattern signal, such as the DSS, as being outside the normal encoded data detection of the magnetic tape drive, and provides an indication of the detection of this field to the processor 60. At least one format detector is provided in the typical magnetic tape drive, and is employed here for the additional purpose of signaling the presence of the pattern to be used for adapting the equalizer filter.

The data of a magnetic tape typically incorporates one or more error correction codes so that errors, such as missing, misread, or misdetected bits or sequences, will not make the data unreadable. If the error correction is unable to correct the data successfully, the tape drive may retry reading the erroneous data. If the data cannot be read after a number of retries, the error may be called a "permanent read error". In one embodiment of the present invention, an error trigger detector 68, which may be implemented in the processor 60 or separately (e.g., via dedicated hardware), detects that reading of data of the magnetic tape is failing to meet a predetermined criteria or trigger. The trigger may comprise a high number of correctable errors over a number of data sets, may comprise a number (including "1") of retries, or may comprise a number (including "1") of permanent read errors. As the result of the detection that the read error trigger has been exceeded, the processor 60 selects required control pattern signals in close proximity to the erroneously detected data. The required control pattern signals may have already been captured. In this manner, the control processor processes the sensed required control pattern signal with respect to a target reference pattern signal to adapt the equalization filter 50 to a transfer function that has a likelihood of being similar to that of the data that was erroneously detected in accordance with the previous transfer function of the equalization filter.

In an embodiment of the present invention, the read detection equalizer filter 50 comprises adjustable presets. The control processor 60 processes the sensed required control pattern signal with respect to a target reference pattern signal to determine correctable difference therebetween, and temporarily adjusts the adjustable read detection equalizer filter taps 51 of the read detection equalizer filter 50 from those presets, to adapt the filter. In a further embodiment, the control processor additionally resets the read detection equalizer filter to the presets for a magnetic tape subsequently loaded in the magnetic tape drive. The loading sensor 18 may detect the unloading of the magnetic tape for which the filter was temporarily adjusted, and the processor resets the filter at that time. Alternatively, the loading sensor 18 may detect the loading of a magnetic tape in the magnetic tape drive, and reset the filter.

In an embodiment of the present invention, tapes may be initialized upon loading. For example, the loading detector 18 detects loading of a magnetic tape in the magnetic tape drive, and signals the control processor 60 to respond to the sensed required control pattern signal to process the sensed required control pattern signal with respect to a target reference pattern signal to initially adapt the adjustable read detection equalizer filter 50.

Alternatively, each required control pattern signal detected by format detector 65 triggers adaption of the read detection equalizer filter 50.

Embodiments of the present invention are illustrated by reference to the flow chart of FIG. 5.

In one embodiment, beginning at step 70, an error trigger, such as error trigger 68 of FIG. 4, detects that reading of data of the magnetic tape exceeds a read error trigger. In step 71 of FIG. 5, the control processor selects required control pattern signals in close proximity to the erroneously detected data, and operates the tape drive to seek to the selected required control pattern signals. In another embodiment, beginning at step 74, a loading detector, such as loading detector 18 of FIG. 4, detects loading of a magnetic tape in the magnetic tape drive, and signals the control processor 60 to initialize the equalization filter 50 for the magnetic tape. In step 75 of FIG. 5, the control processor operates the tape drive to seek to required control pattern signals, for example, near the beginning of tape.

In step 78, a format detector, such as format detector 65 of FIG. 4 identifies the required control pattern signals, such as a DSS pattern as being outside the normal encoded data detection of the magnetic tape drive for data. As discussed above, the data set separator (DSS), may comprise a series of isolated transitions separated by 12 write clock periods "12T" (for the LTO Gen. 2). One period of the DSS field consists of 24 bits, containing a positive and a negative transition. Upon detecting a consecutive sequence of 12T patterns representing the required control pattern, the format detector signals the control processor 60 to store the required control pattern signals in a memory. In an examplary magnetic tape drive with a plurality of read heads, there are a number of data tracks operating simultaneously. The input waveform is captured simultaneously on all tracks and stored in the memory buffer. The required number of samples per track, s, may be kept small to limit the required size of the data buffer, Ns, where N is the number of data tracks.

Alternatively, in step 79, detection of sensed required control pattern signals by format detector 65 of FIG. 4 triggers the control processor 60 to store the required control pattern signals in memory 63.

The digital samples are time based, or position based, as opposed to frequency based. In one embodiment of the invention, in step 80 of FIG. 5, the digital samples of the required control pattern signals within a given window are aligned and averaged by the control processor. In this manner, the effect of additive noise is reduced by averaging several periods of the input waveform. By averaging n successive periods, the signal-to-noise ratio is increased by $10 \log_{10} n$.

Figure 6:
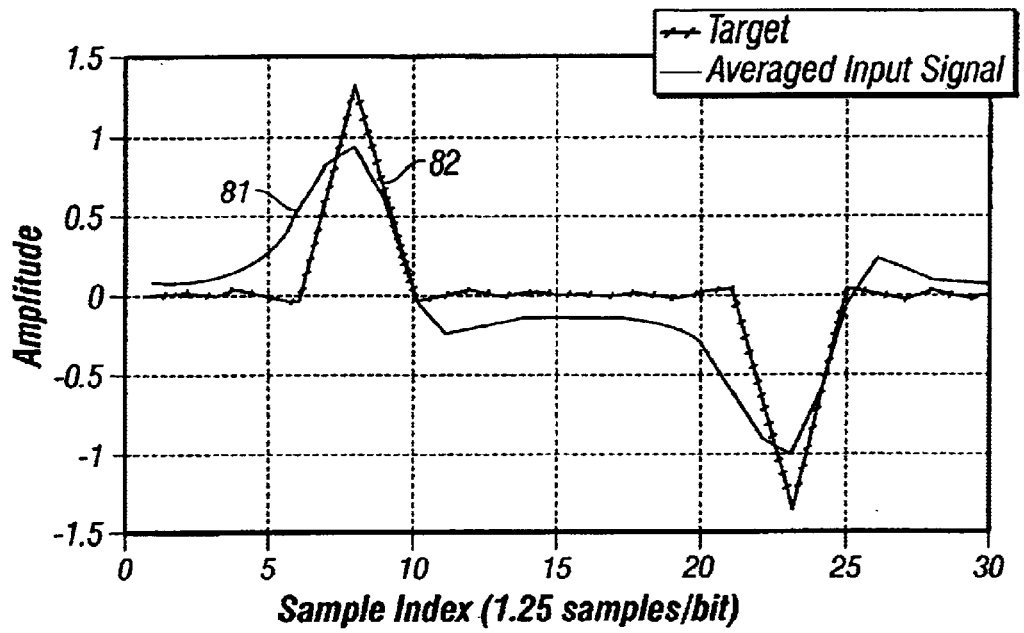
FIGS. 6 and 7 are diagrammatic representations of control pattern signals during processing by the read detection system of FIG. 4.

FIG. 6 illustrates an example of an averaged input signal 81 and the target 82 used for the equalizer calculation. Each curve consists of 24 bits, but since the examplary asynchronous sampling rate is 1.25 samples/bit, the period is 24*1.25=30 samples. The input signal is obtained by averaging 8 periods of the DSS signal. The target comprises the same number of samples as the averaged input signal.

Figure 5:
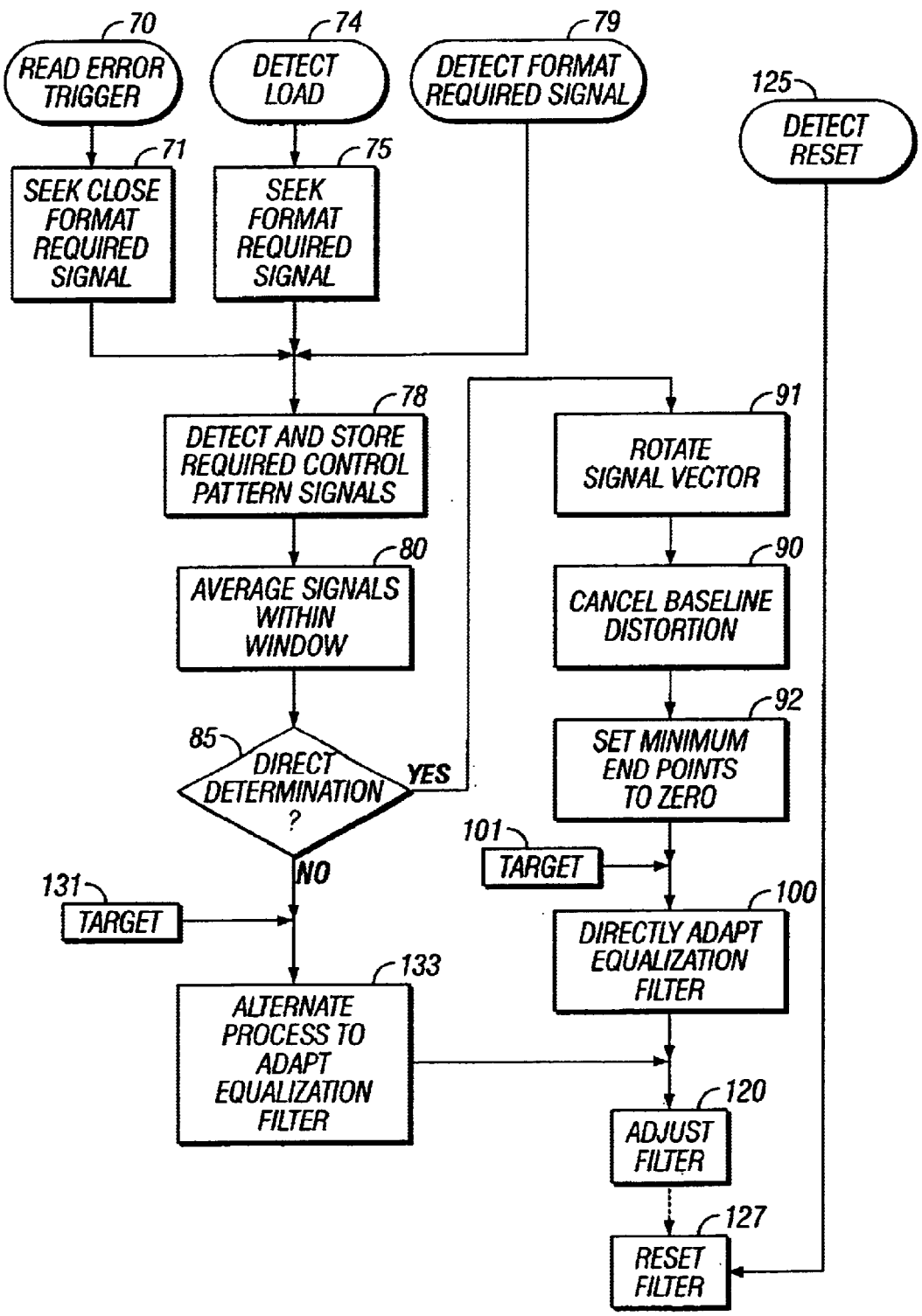
FIG. 5 is a flow chart depicting an embodiment of computer implemented methods of the present invention.

Referring to FIG. 5, in one embodiment of the present invention, the control processor responds to time based digital samples of the required control pattern signal; and directly adapts the equalizer from the captured wave form, and calculates an equalizer that minimizes the mean square error (MSE) between the equalized signal and the ideal equalizer target, employing Wiener optimum estimation, as will be discussed. Step 85 determines whether the direct determination algorithm is being employed, leading to path 86, or an alternative algorithm is being employed. In implementations in which the program code is limited, the decision block of step 85 and one of the legs extending from the decision block may be omitted, and the program code limited to one alternative only.

The equalizer is calculated at path 86 by solving a Toeplitz matrix equation, as will be discussed.

In a further embodiment, the control processor additionally, in step 91, rotates a minimum slope point of a signal vector of the sensed required control pattern signal to an end of the signal vector, and, in step 92, sets the minimum slope point to zero. This tends to make the calculations easier by reducing the values of some of the computations.

In an embodiment of the present invention, the control processor, in step 90, cancels baseline distortion of the sensed required control pattern signal. In one example, the control processor cancels the baseline distortion of the sensed required control pattern signal by conducting cosine compensation of the baseline distortion. This tends to make the signal symmetrical for easier calculation.

Step 91 is accomplished by rotating the maximum amplitude point of the signal vector to a distance from the end of the rotated signal vector that will allow the minimum slope point to be at an end. The adjacent minimum slope point will then be at the opposite end of the vector.

A formula for conducting steps 90 and 92 is as follows, where "c" represents the correction for the end points, and "d" represents the cosine compensation of the baseline distortion: $f = a - c + d(1 - \cos(2pi*x/30))$
where:

f is the corrected 30-sample DSS average a is the 30-sample DSS average before correction x is the integer sequence 0,1,2 . . . 29 c=a[1], the amplitude of the first sample d=(a[15]−a[1])/2 half the difference between the fifteenth and first sample amplitudes.

Figure 7:
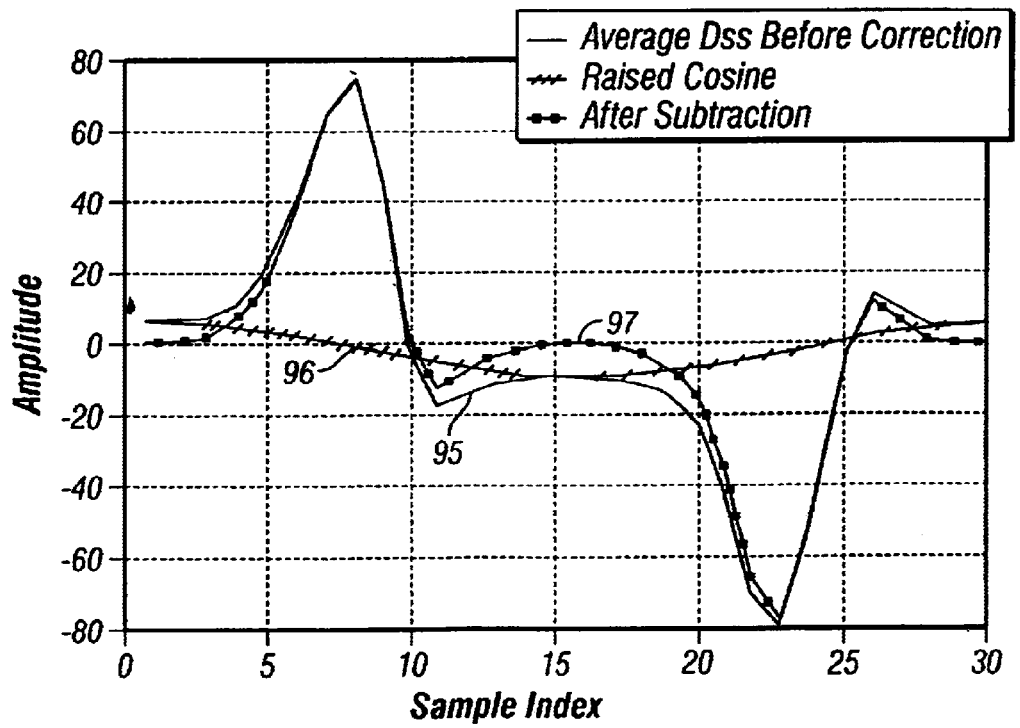

FIG. 7 illustrates the averaged DSS before correction 95, the correction waveform 96, and the corrected DSS average 97.

In step 100, the control processor responds to the corrected time based digital samples of the required control pattern signal; and directly adapts the read detection equalizer filter to a target reference pattern signal 101.

FIG. 8 illustrates a matrix equation in terms of the target vector "T", the signal matrix "s", and the equalizer vector "E", combining steps 101 and 102. The length of the equalizer vector, E, is "N", which corresponds to the required number of equalizer coefficients. The number of columns in s is also equal to N. The first column of the signal matrix, s, consists of "M" signal samples (in the illustrated example, M=30) and N−1 zeroes. This column is then shifted by one for each additional column in the matrix s. The target vector, T, comprises M target samples and N−1 zeroes.

Solving this equation for the unknown equalizer coefficients, E, would require calculating $$e = s^{-1} \times T.$$

Since generally s is not a square matrix, $s^{-1}$ is not defined. Instead, the equation is rewritten as:

$$s^T \times T = (s^T \times s) \times E,$$

where $s^T$ is the matrix transpose of s.

This equation can be rewritten simply as $$C = A \times E.$$

Here, the vector $C = s^T \times T$ represents the cross correlation of the signal s with the target T. The matrix $A = s^T \times s$ is an N×N square matrix that contains lags of the auto correlation of the signal s.

The matrix A is Toeplitz which has the structure illustrated in FIG. 9. A can be determined by its first column. All the other columns can be derived as rotations from the first column. In addition, A is symmetric about its diagonal, $A_{ij} = A_{ji}$. This symmetry provides for efficient algorithms of solving the above equation for the equalizer vector, E. An algorithm of the Levinson type, providing direct calculation of the equalizer filter vector, is accomplished by varying the internal calculations of k1 and k2 to accommodate magnetic tape, from the Levinson algorithm discussed in "Fast Algorithms for Digital Signal Processing", R. A. Blahut, Addison-Wesley Publishing, Reading, Mass., 1985, pp. 352–358.

An example of a Levinson algorithm is outlined in pseudocode below:

```
k1=1
r=1
E(1)=C(1)/A(1)
T=1
alpha=A(1)
for r=2:N
        E=E,0
```

-continued

```
    T=T,0
    gamma=A(r)E(1)+A(r-1)E(2)+...+A(1)E(r)
    beta=A(r)T(1)+A(r-1)T(2)+...A(1)T(r)
    k2=-beta/alpha
    alpha=k1*alpha+k2*beta
    T=k1*T+k2*(T(r),T(r-1),...T(1))
    k3=(C(r)-gamma(r-1)/alpha
    E=E+k3*(T(r),T(r-1),...,T(1))
end
```

In a specific example, 512 samples of the DSS waveform are captured per track. Eight successive DSS periods are averaged to produce an input to the equalizer calculation. Therefore, one average corresponds to 8×30=240 samples. So, for each captured DSS waveform, two averages and therefore two equalizers can be computed per track. For each equalizer, the MSE is calculated that minimizes the mean square error (MSE) between the equalized signal and the ideal equalizer target, employing Wiener optimum estimation, and stored. Hence, the output equalizer is the one with the minimum MSE. The direct calculation of the equalizer filter vector is derived from Wiener, for example, as discussed in the "Journal of Mathematics and Physics", "Volume XXV", P. D. Crout, et al., Massachusetts Institute of Technology, 1946, pp. 261–271.

Then, in step 120, the read detection equalizer filter is replaced with the output of the equalizer calculation. The adjustment may be a temporary adjustment, either until the error trigger is again reached, or may be until the tape is unloaded or another tape is loaded, or, per step 79, the equalizer calculation can be performed for every encountered required control pattern signal, e.g., DSS.

As discussed above, the read detection equalizer filter 50 of FIG. 4 may, in one embodiment, comprise adjustable presets. The control processor 60 control processor temporarily adjusts the adjustable read detection equalizer filter taps 51 of the read detection equalizer filter 50 from those presets. In a further embodiment, the control processor additionally resets the read detection equalizer filter to the presets for a magnetic tape subsequently loaded in the magnetic tape drive. In step 125 of FIG. 5, the loading sensor 18 of FIG. 4 may detect the unloading of the magnetic tape for which the filter was temporarily adjusted, and the processor, in step 127 of FIG. 5, resets the filter at that time. Alternatively, the loading sensor may detect the loading of a magnetic tape in the magnetic tape drive, and step 127 resets the filter to one appropriate for that type of media (e.g., may depend on the generation of media format or the media manufacturer).

Other types of adaptive equalization techniques are known to those of skill in the art, employing another leg of step 85, in which the control processor responds to digital samples of the required control pattern signal; and, in step 133, determines the adjustments to the equalization filter. Then, in step 120, as discussed above, the read detection equalizer filter is adjusted to compensate for the determined correctable difference.

Each equalizer filter for each track of a multi-track head may be adjusted in sequence or as needed, or, alternatively, all may be adjusted simultaneously.

The illustrated components of the magnetic tape drive 10 of FIG. 1, and the components of the read-detection system of FIG. 4 may be varied, combined, or combined functions may be separated, as is known to those of skill in the art. The illustrated steps of FIG. 5 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A read detection system for a magnetic tape drive, comprising:
    an adjustable read detection equalizer filter for equalizing output signals from at least one magnetic read head; and
    a control processor responsive to at least a portion of a required control pattern signal sensed from a magnetic tape by said at least one magnetic read head, said required control pattern signal comprising a required portion of a normal recording format of said magnetic tape, said control processor processing said sensed required control pattern signal with respect to a target reference pattern signal to adapt said read detection equalizer filter to said target reference pattern signal.

2. The read detection system of claim 1, wherein said required control pattern signal additionally comprises a pattern of signals outside normal encoded data detection of said magnetic tape drive, and wherein said system additionally comprises a control pattern recognition sensor for recognizing said required control pattern signal, triggering said control processor to respond to said sensed required control pattern signal.

3. The read detection system of claim 2, wherein said required control pattern signal comprises a data set separator signal, and wherein said control pattern recognition sensor recognizes at least one signal of a greater time period than a maximum time period of normal encoded data detection of said magnetic tape drive, as said required control pattern signal.

4. The read detection system of claim 3, wherein said required control pattern signal comprises a data set separator signal, and wherein said control pattern recognition sensor recognizes a sequence of signals outside normal encoded data detection of said magnetic tape drive, as said required control pattern signal.

5. The read detection system of claim 1, wherein said control processor additionally cancels baseline distortion of said sensed required control pattern signal.

6. The read detection system of claim 5, wherein said control processor, in canceling said baseline distortion of said sensed required control pattern signal, conducts cosine compensation of said baseline distortion.

7. The read detection system of claim 1, wherein said required control pattern signal is repeated at a plurality of locations of a magnetic tape read by said magnetic tape drive, and said read detection system additionally comprises an error detector for detecting that reading of data of a magnetic tape exceeds a read error trigger, and, as the result of said detection, selecting at least one said required control pattern signal in close proximity to said data detected as exceeding said read error trigger.

8. The read detection system of claim 7, wherein said read detection equalizer filter comprises adjustable presets, and wherein said control processor temporarily adjusts said read detection equalizer filter from said presets.

9. The read detection system of claim 8, wherein said control processor additionally resets said read detection equalizer filter to said presets for a magnetic tape subsequently loaded in said magnetic tape drive.

10. The read detection system of claim 1, additionally comprising a loading detector for detecting loading of a magnetic tape in said magnetic tape drive, and, in response to detecting said loading of a magnetic tape, initiating operation of said control processor to respond to said sensed required control pattern signal.

11. The read detection system of claim 1, additionally comprising an ADC to convert said output signals to time based digital samples, and wherein said control processor responds to said time based digital samples of said required control pattern signal; and directly adapts said read detection equalizer filter to said target reference pattern signal.

12. The read detection system of claim 11, wherein said control processor additionally rotates a minimum slope point of a signal vector of said sensed required control pattern signal to an end of said signal vector and sets said minimum slope point to zero.

13. The read detection system of claim 1, additionally comprising an ADC to convert said output signals to time based digital samples, and wherein said control processor responds to said digital samples of said required control pattern signal; and additionally averages similar said digital samples within a window comprising a plurality of magnetic transitions.

14. A method for adjusting a read detection equalizer filter of a magnetic tape drive, comprising the steps of:
  sensing at least a portion of a required control pattern signal recorded on a magnetic tape, said required control pattern signal comprising a required portion of a normal recording format of said magnetic tape; and
  processing said sensed required control pattern signal with respect to a target reference pattern signal to adapt said read detection equalizer filter to said target reference pattern signal.

15. The method of claim 14, wherein said required control pattern signal additionally comprises a pattern of signals outside normal encoded data detection of said magnetic tape drive, and wherein said method additionally comprises the step of recognizing said required control pattern signal, triggering said sensing step.

16. The method of claim 15, wherein said required control pattern signal comprises a data set separator signal, and wherein said step of recognizing said required control pattern signal comprises recognizing at least one signal of a greater time period than a maximum time period of normal encoded data detection of said magnetic tape drive.

17. The method of claim 15, wherein said required control pattern signal comprises a data set separator signal, and wherein said step of recognizing said required control pattern signal comprises recognizing a sequence of signals outside normal encoded data detection of said magnetic tape drive.

18. The method of claim 14, wherein said step of processing said sensed required control pattern signal additionally comprises canceling baseline distortion of said sensed required control pattern signal.

19. The method of claim 18, wherein said step of canceling said baseline distortion of said sensed required control pattern signal comprises cosine compensation of said baseline distortion.

20. The method of claim 14, wherein said required control pattern signal is repeated at a plurality of locations of a magnetic tape read by said magnetic tape drive, and wherein said method additionally comprises the steps of detecting that reading of data of a magnetic tape by said magnetic tape drive exceeds a read error trigger; and, as the result of said detection, selecting at least one said required control pattern signal in close proximity to said data detected as exceeding said read error trigger.

21. The method of claim 20, wherein said read detection equalizer filter comprises adjustable presets, and wherein said step of adapting said read detection equalizer filter comprises a temporary adjustment from said presets.

22. The method of claim 21, additionally comprising the step of resetting said read detection equalizer filter to said presets for a magnetic tape subsequently loaded in said magnetic tape drive.

23. The method of claim 14, additionally comprising the step of detecting the loading of a magnetic tape in said magnetic tape drive, and as the result of said detection, conducting said step of processing said required control pattern signal recorded on said magnetic tape.

24. The method of claim 14, wherein said step of sensing said required control pattern signal additionally comprises determining time based digital samples of said required control pattern signal; and wherein said step of processing said sensed required control pattern signal with respect to a target reference pattern signal, comprises responding to said time based digital samples and directly adapting said read detection equalizer filter to said target reference pattern signal.

25. The method of claim 24, wherein said step of processing said sensed required control pattern signal with respect to said target reference pattern signal additionally comprises rotating a minimum slope point of a signal vector of said sensed required control pattern signal to an end of said signal vector and setting said minimum slope point to zero.

26. The method of claim 14, wherein said step of sensing said required control pattern signal additionally comprises determining digital samples of said required control pattern signal; said step of processing said sensed required control pattern signal additionally comprises averaging similar said determined digital samples within a window comprising a plurality of magnetic transitions.

27. A magnetic tape drive, comprising:
  at least one magnetic read head for reading a magnetic tape;
  a drive mechanism for moving a magnetic tape relative to said at least one magnetic read head;
  an adjustable read detection equalizer filter for equalizing output signals from said at least one magnetic read head; and
  a control processor responsive to at least a portion of a required control pattern signal sensed from a magnetic tape by said at least one magnetic read head, said required control pattern signal comprising a required portion of a normal recording format of said magnetic tape, said control processor processing said sensed required control pattern signal with respect to a target reference pattern signal to adapt said read detection equalizer filter to said target reference pattern signal.

28. The magnetic tape drive of claim 27, wherein said required control pattern signal additionally comprises a pattern of signals outside normal encoded data detection of said magnetic tape drive, and wherein said system additionally comprises a control pattern recognition sensor for recognizing said required control pattern signal, triggering said control processor to respond to said sensed required control pattern signal.

29. The magnetic tape drive of claim 28, wherein said required control pattern signal comprises a data set separator signal, and wherein said control pattern recognition sensor recognizes at least one signal of a greater time period than a maximum time period of normal encoded data detection of said magnetic tape drive, as said required control pattern signal.

30. The magnetic tape drive of claim 29, wherein said required control pattern signal comprises a data set separator signal, and wherein said control pattern recognition sensor recognizes a sequence of signals outside normal encoded data detection of said magnetic tape drive, as said required control pattern signal.

31. The magnetic tape drive of claim 27, wherein said control processor additionally cancels baseline distortion of said sensed required control pattern signal.

32. The magnetic tape drive of claim 31, wherein said control processor, in canceling said baseline distortion of said sensed required control pattern signal, conducts cosine compensation of said baseline distortion.

33. The magnetic tape drive of claim 27, wherein said required control pattern signal is repeated at a plurality of locations of a magnetic tape, and said magnetic tape drive additionally comprises an error detector for detecting that reading of data of a magnetic tape exceeds a read error trigger, and, as the result of said detection, selecting at least one said required control pattern signal in close proximity to said data detected as exceeding said read error trigger.

34. The magnetic tape drive of claim 33, wherein said read detection equalizer filter comprises adjustable presets, and wherein said control processor temporarily adjusts said read detection equalizer filter from said presets.

35. The magnetic tape drive of claim 34, wherein said control processor additionally resets said read detection equalizer filter to said presets for a magnetic tape subsequently loaded in said magnetic tape drive.

36. The magnetic tape drive of claim 27, additionally comprising a loading detector for detecting loading of a magnetic tape in said magnetic tape drive, and, in response to detecting said loading of a magnetic tape, initiating operation of said control processor to respond to said sensed required control pattern signal.

37. The magnetic tape drive of claim 27, additionally comprising an ADC to convert said output signals to time based digital samples, and wherein said control processor responds to said time based digital samples of said required control pattern signal; and directly adapts said read detection equalizer filter to said target reference pattern signal.

38. The magnetic tape drive of claim 37, wherein said control processor additionally rotates a minimum slope point of a signal vector of said sensed required control pattern signal to an end of said signal vector and sets said minimum slope point to zero.

39. The magnetic tape drive of claim 27, additionally comprising an ADC to convert said output signals to time based digital samples; and wherein said control processor responds to digital samples of said required control pattern signal; and additionally averages similar said digital samples within a window comprising a plurality of magnetic transitions.

40. A computer program product usable with a programmable computer processor having computer readable program code embodied therein, said programmable computer processor for adjusting an adjustable read detection equalizer filter of a read detection system for a magnetic tape drive, said adjustable read detection equalizer filter for equalizing output signals from at least one magnetic head, said computer program product comprising:

computer readable program code which causes said programmable computer processor to respond to at least a portion of a required control pattern signal sensed from a magnetic tape by said at least one magnetic read head, said required control pattern signal comprising a required portion of a normal recording format of said magnetic tape; and computer readable program code which causes said programmable computer processor to process said sensed required control pattern signal with respect to a target reference pattern signal to adapt said read detection equalizer filter to said target reference pattern signal.

41. The computer program product of claim 40, wherein said computer readable program code additionally causes said programmable computer processor to cancel baseline distortion of said sensed required control pattern signal.

42. The computer program product of claim 41, wherein said computer readable program code causes said programmable computer processor to, in canceling said baseline distortion of said sensed required control pattern signal, conduct cosine compensation of said baseline distortion.

43. The computer program product of claim 40, wherein said required control pattern signal is repeated at a plurality of locations of a magnetic tape read by said magnetic tape drive, and said read detection system additionally comprises an error detector for detecting that reading of data of a magnetic tape exceeds a read error trigger, and, as the result of said detection, selecting at least one said required control pattern signal in close proximity to said data detected as exceeding said read error trigger; and wherein said computer readable program code causes said programmable computer processor to respond to said error detector detecting said exceeding of said read error trigger, processing said selected sensed required control pattern signal with respect to said target reference pattern signal.

44. The computer program product of claim 43, wherein said read detection equalizer filter comprises adjustable presets; and wherein said computer readable program code causes said programmable computer processor to temporarily adjust said read detection equalizer filter from said presets.

45. The computer program product of claim 44, wherein said computer readable program code additionally causes said programmable computer processor to reset said read detection equalizer filter to said presets for a magnetic tape subsequently loaded in said magnetic tape drive.

46. The computer program product of claim 40, wherein said magnetic tape drive additionally comprises a loading detector for detecting loading of a magnetic tape in said magnetic tape drive; and wherein said computer readable program code causes said programmable computer processor to respond to said loading detector detecting said loading of a magnetic tape, to initiate said processing of said selected sensed required control pattern signal with respect to said target reference pattern signal.

47. The computer program product of claim 40, wherein said computer readable program code causes said programmable computer processor to respond to time based digital samples of said required control pattern signal; and directly adapt said read detection equalizer filter to said target reference pattern signal.

48. The computer program product of claim 47, wherein said computer readable program code additionally causes said programmable computer processor to rotate a minimum slope point of a signal vector of said sensed required control pattern signal to an end of said signal vector and set said minimum slope point to zero.

49. The computer program product of claim 40, wherein said computer readable program code causes said programmable computer processor to respond to digital samples of said required control pattern signal; and additionally average similar said digital samples within a window comprising a plurality of magnetic transitions.

50. Logic for adjusting an adjustable read detection equalizer filter of a read detection system for a magnetic tape drive, said adjustable read detection equalizer filter for equalizing output signals from at least one magnetic head, said logic:

responding to at least a portion of a required control pattern signal sensed from a magnetic tape by said at least one magnetic read head, said required control pattern signal comprising a required portion of a normal recording format of said magnetic tape; and processing said sensed required control pattern signal with respect to a target reference pattern signal to adapt said read detection equalizer filter to said target reference pattern signal.

51. The logic of claim 50, additionally cancelling baseline distortion of said sensed required control pattern signal.

52. The logic of claim 51, in canceling said baseline distortion of said sensed required control pattern signal, conducts cosine compensation of said baseline distortion.

53. The logic of claim 50, wherein said required control pattern signal is repeated at a plurality of locations of a magnetic tape read by said magnetic tape drive, and said read detection system additionally comprises an error detector for detecting that reading of data of a magnetic tape exceeds a read error trigger, and, as the result of said detection, selecting at least one said required control pattern signal in close proximity to said data detected as exceeding said read error trigger; and wherein said logic responds to said error detector detecting said exceeding of said read error trigger, processing said selected sensed required control pattern signal with respect to said target reference pattern signal.

54. The logic of claim 53, wherein said read detection equalizer filter comprises adjustable presets; and wherein said logic temporarily adjusts said read detection equalizer filter from said presets.

55. The logic of claim 54, wherein said logic additionally resets said read detection equalizer filter to said presets for a magnetic tape subsequently loaded in said magnetic tape drive.

56. The logic of claim 50, wherein said magnetic tape drive additionally comprises a loading detector for detecting loading of a magnetic tape in said magnetic tape drive; and wherein said logic responds to said loading detector detecting said loading of a magnetic tape, to initiate said processing of said selected sensed required control pattern signal with respect to said target reference pattern signal.

57. The logic of claim 50, wherein said logic responds to time based digital samples of said required control pattern signal; and directly adapts said read detection equalizer filter to said target reference pattern signal.

58. The logic of claim 57, wherein said logic rotates a minimum slope point of a signal vector of said sensed required control pattern signal to an end of said signal vector and sets said minimum slope point to zero.

59. The logic of claim 50, wherein said logic responds to digital samples of said required control pattern signal; and additionally averages similar said digital samples within a window comprising a plurality of magnetic transitions.

* * * * *